(12) United States Patent
Takahashi

(10) Patent No.: US 10,629,240 B2
(45) Date of Patent: Apr. 21, 2020

(54) RECORDED DATA PROCESSING METHOD AND RECORDED DATA PROCESSING DEVICE

(71) Applicant: YAMAHA CORPORATION, Shizuoka (JP)

(72) Inventor: Yu Takahashi, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 59 days.

(21) Appl. No.: 16/126,082

(22) Filed: Sep. 10, 2018

(65) Prior Publication Data

US 2019/0005984 A1  Jan. 3, 2019

Related U.S. Application Data

(63) Continuation-in-part of application No. PCT/JP2017/008267, filed on Mar. 2, 2017.

(51) Int. Cl.
  *G11B 27/10* (2006.01)
  *G11B 27/36* (2006.01)
  (Continued)

(52) U.S. Cl.
  CPC .............. *G11B 27/10* (2013.01); *G10L 25/06* (2013.01); *G11B 27/031* (2013.01); *G11B 27/36* (2013.01); *H04N 5/247* (2013.01); *H04N 5/91* (2013.01)

(58) Field of Classification Search
  CPC ....... G11B 27/10; G11B 27/36; G11B 27/031; H04N 5/247; H04N 5/91; H04N 21/4307;
  (Continued)

(56) References Cited

U.S. PATENT DOCUMENTS 7,551,832 B2 * 6/2009 Plourde, Jr. .............. H04N 5/76
                                                    386/248
8,205,148 B1 * 6/2012 Sharpe ................... G11B 27/10
                                                    715/203

(Continued)

FOREIGN PATENT DOCUMENTS

CA      2665696 A1   11/2009
JP      3643372 B1    4/2005
         (Continued)

OTHER PUBLICATIONS

International Search Report and Written Opinion of PCT Application No. PCT/JP2017/008267, dated May 16, 2017, 01 page of English Translation and 06 pages of ISRWO.

*Primary Examiner* — David E Harvey
(74) *Attorney, Agent, or Firm* — Chip Law Group

(57) ABSTRACT

A recorded data processing method includes: for each of N recorded data pairs each formed by two pieces of recorded data X that are adjacent to each other when N pieces of recorded data X each representing a recording target including at least one of audio and video are arranged cyclically, calculating a plurality of candidate values for a time difference between time signals representing temporal changes of the recording target in the two respective pieces of recorded data X of the recorded data pair; and identifying one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero.

14 Claims, 4 Drawing Sheets

(51) Int. Cl.
*H04N 5/247* (2006.01)
*G10L 25/06* (2013.01)
*G11B 27/031* (2006.01)
*H04N 5/91* (2006.01)

(58) Field of Classification Search
CPC . H04N 21/4394; H04N 21/44008; H04N 5/04
See application file for complete search history.

(56) References Cited

U.S. PATENT DOCUMENTS

| | | | |
|---|---|---|---|
| 8,682,144 B1* | 3/2014 | Zhang | G06K 9/00765 |
| | | | 386/201 |
| 8,924,345 B2* | 12/2014 | Bryan | G06F 16/683 |
| | | | 707/610 |
| 10,158,907 B1* | 12/2018 | Wang | G06F 16/41 |
| 2009/0282452 A1 | 11/2009 | Wei | |
| 2010/0201824 A1 | 8/2010 | Wei | |
| 2010/0208079 A1 | 8/2010 | Wei | |
| 2013/0121662 A1* | 5/2013 | Moorer | H04N 21/4223 |
| | | | 386/240 |
| 2013/0188923 A1* | 7/2013 | Hartley | H04N 9/87 |
| | | | 386/241 |

FOREIGN PATENT DOCUMENTS

| | | |
|---|---|---|
| JP | 2005-148161 A | 6/2005 |
| JP | 2008-193561 A | 8/2008 |

\* cited by examiner

RECORDED DATA PROCESSING METHOD AND RECORDED DATA PROCESSING DEVICE

CROSS-REFERENCE TO RELATED APPLICATIONS

This application is a continuation-in-part application of International Application No. PCT/JP2017/008267, filed Mar. 2, 2017, which claims priority to Japanese Patent Application No. 2016-045131 filed in Japan on Mar. 9, 2016. The entire disclosures of International Application No. PCT/JP2017/008267 and Japanese Patent Application No. 2016-045131 are hereby incorporated herein by reference.

BACKGROUND

Technological Field

The present technology relates to a processing recorded data.

Background Art

Various technologies have been proposed for processing mutual temporal relation between a plurality of pieces of recorded data including video and audio. For example, Japanese Laid-Open Patent Application No. 2008-193561 (hereinafter referred to as Patent Document 1) discloses technology for analyzing a plurality of pieces of audio data each recorded at a time of capturing of a plurality of videos obtained by capturing a same subject from different positions, and thereby generates time difference information for synchronizing the plurality of videos. Specifically, the time difference information is generated according to a shift time that maximizes a cross-correlation function between two pieces of audio data.

SUMMARY

A recorded data processing method in accordance with some embodiments including: calculating for each of N (N is a natural number of three or more) recorded data pairs each formed by two pieces of recorded data that are adjacent to each other when N pieces of recorded data each representing a recording target including at least one of audio and video are arranged cyclically, a plurality of candidate values for a time difference between time signals representing temporal changes of the recording target in the two respective pieces of recorded data of the recorded data pair; and identifying one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero.

A recorded data processing device in accordance with some embodiments including: a candidate calculating unit configured to calculate, for each of N (N is a natural number of three or more) recorded data pairs each formed by two pieces of recorded data that are adjacent to each other when N pieces of recorded data each representing a recording target including at least one of audio and video are arranged cyclically, a plurality of candidate values for a time difference between time signals representing temporal changes of the recording target in the two respective pieces of recorded data of the recorded data pair; and an analysis processing unit configured to identify one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero.

DESCRIPTION OF EMBODIMENTS

In conventional systems, there is a possibility that an error between the shift time calculated from the maximum value of the cross-correlation function and an actual shift time may be increased when the audio data includes reverberation or noise, for example. In view of the above circumstances, it is an object of some embodiments to identify a time difference between pieces of recorded data with high accuracy.

Selected embodiments will now be explained with reference to the drawings. It will be apparent to those skilled in the audio field from this disclosure that the following descriptions of the embodiments are provided for illustration only and not for the purpose of limiting the invention as defined by the appended claims and their equivalents.

First Embodiment

Figure 1:
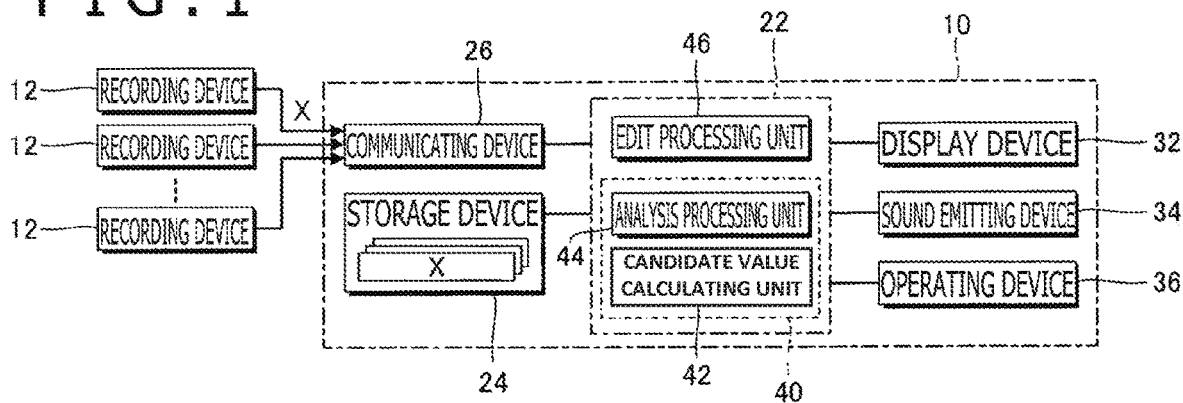
FIG. 1 is a block diagram of a recorded data editing system according to a first embodiment.

FIG. 1 is a block diagram of a recorded data editing system 10 according to a first embodiment. The recorded data editing system 10 is a computer system for processing audio (for example, voice or musical audio) and movie. As illustrated in FIG. 1, the recorded data editing system 10 includes an electronic controller 22, a storage device 24, a communicating device 26, a display device 32, an audio emitting device 34, and an operating device 36. In some embodiments, example system arrangements for the recorded data editing system 10 include, but are not limited to, a portable information processing device, a cellular phone, a smart phone, a tablet terminal, a personal computer, or the like. Also, the recorded data editing system 10 can also be implemented by a stationary information processing device.

The term "electronic controller" as used herein refers to hardware that executes software programs. The electronic controller 22 includes processing device (for example, a central processing unit (CPU)) that controls the elements of recorded data editing system 10.

The term "communicating device" as used herein includes a receiver, a transmitter, a transceiver and a transmitter receiver, capable of transmitting and/or receiving communication signals. In this embodiment, the communicating device 26 transmits communication signals, and thus, the communicating device 26 can be a transmitter, a transceiver or a transmitter receiver.

The communicating device 26 communicates with a plurality of (N) recording devices 12 (N is a natural number of three or more). Each recording device 12 is an apparatus including an audio collecting device collecting audio and a video device collecting video by capturing video and audio. Each recording device 12 generates data X representing the audio collected by the audio collecting device and the video collected by the video device (which data will hereinafter be referred to as "recorded data"). The recording devices 12 are video apparatuses such as digital camcorders or the like and information terminals such as cellar phones, smart phones, or the like having a recording function. The communicating device 26 in the first embodiment receives recorded data X from each of the N recording devices 12. Specifically, the communicating device 26 receives the recorded data X from each of the recording devices 12 by publicly known short-range radio communication such as Wi-Fi (registered trademark), Bluetooth (registered trademark), or the like. However, a method of communication between the communicating device 26 and each of the recording devices 12 is arbitrary. For example, the communicating device 26 can also communicate with each of the recording devices 12 by wire.

The storage device 24 is formed by recording medium such as a magnetic recording medium, a semiconductor recording medium, or the like. The storage device 24 stores a program executed by the electronic controller 22 and various kinds of data used by the electronic controller 22. The storage device 24 in the first embodiment stores N pieces of recorded data X1 to XN received by the communicating device 26 from the respective recording devices 12. It is also possible to store the N pieces of recorded data X1 to XN in the storage device 24 in advance. In this case, the communicating device 26 can be omitted from the recorded data editing system 10. In addition, it is also possible to install the storage device 24 in a server with which the recorded data editing system 10 can communicate (that is, a cloud storage). In this case, the storage device 24 can be omitted from the recorded data editing system 10.

The N recording devices 12, for example, record, in parallel with each other, audio and video as a common recording target (recording object) at mutually different positions. For example, the plurality of recording devices 12 are arranged at mutually different positions in a common acoustic space such as a hall, a concert hall, a dance hall or the like, and each of the plurality of recording devices 12 generates the recorded data X by recording a state of a stage and audience, for example, from a different angle. The recorded data X in the first embodiment represents the recording target including the audio collected by an audio collecting device and the video collected by a video device. Specifically, the recorded data X includes an audio signal representing temporal changes in the audio collected by the audio collecting device and a video signal representing temporal changes captured by the video device (that is, a movie). For example, in a case where the played audio of a musical piece for a play performed on a stage is reproduced from an audio emitting device (for example, a speaker) installed on the stage, the audio of the recorded data X recorded by each of the recording devices 12 includes the played audio in common (though audio characteristics such as volume and the like can differ). A user of each recording device 12 separately starts recording by the own recording device 12. Hence, a start point of recording of the audio and the video does not precisely coincide between the N pieces of recorded data X1 to XN, but can differ for each piece of recorded data X. That is, there are time differences between the N pieces of recorded data X1 to XN. Incidentally, the first embodiment assumes, for convenience, a case where recording periods of all of the N pieces of recorded data X1 to XN partly overlap each other on a time axis. Incidentally, while the recording target including both the audio and the video is illustrated, a recording target including only one of audio and video can also be assumed.

The display device 32 (for example, a liquid crystal display panel) in FIG. 1 displays videospecified from the electronic controller 22. The audio emitting device 34 (for example, a speaker or headphones) emits audio specified from the electronic controller 22. The operating device 36 is an input apparatus receiving an instruction from a user. The operating device 36 is, for example, formed by a plurality of operating elements detecting operations by the user or a touch panel detecting contact of the user with a display surface of the display device 32.

The electronic controller 22 implements a plurality of functions (a recorded data analyzing unit 40 and an edit processing unit 46) for processing the N pieces of recorded data X1 to XN by executing the program stored in the storage device 24. Incidentally, it is also possible to adopt a configuration in which a part of the functions of the electronic controller 22 is implemented by an electronic circuit dedicated to audio processing or video processing or a configuration in which the functions of the electronic controller 22 are distributed to a plurality of devices.

Figure 2:
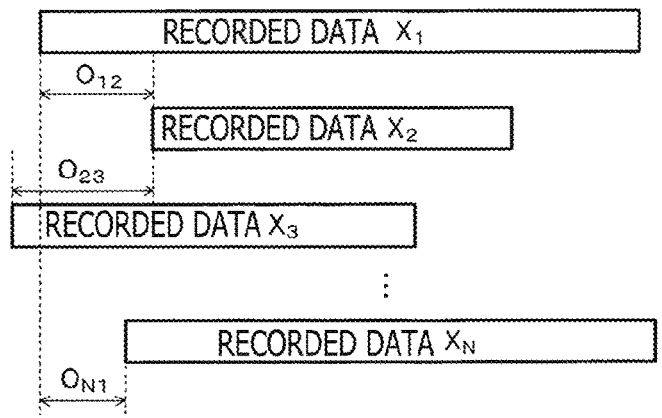
FIG. 2 is a diagram of assistance in explaining time differences in N recorded data pairs.

As illustrated in FIG. 2, the recorded data analyzing unit 40 determines a time difference Oij (i, j=1 to N, i≠j) between two pieces of recorded data Xi and Xj that are adjacent to each other (next to each other) when the N pieces of recorded data X1 to XN generated by the recording devices 12 are arranged cyclically. The cyclic arrangement of the N pieces of recorded data X1 to XN means an arrangement (annular arrangement) in which the N pieces of recorded data X1 to XN are arranged in series with each other and the first recorded data X1 is made to follow the last recorded data XN. Hence, the cyclic arrangement of the N pieces of recorded data X1 to XN includes a pair (hereinafter referred to as a "recorded data pair") Pij formed by two pieces of recorded data Xi and Xj adjacent to each other. That is, there are N combinations between the numerical value i and the numerical value j: (i, j)=(1, 2), (2, 3), . . . , (N-1, N), (N, 1). That is, the arrangement of the N pieces of recorded data X1 to XN includes N recorded data pairs P12 to PN1. As is understood from FIG. 2, the time difference Oij means a relative time (offset) of the recorded data Xj when the recorded data Xi is set as a reference. Incidentally, the permutation of the N pieces of recorded data X1 to XN arranged cyclically is arbitrary.

As illustrated in FIG. 1, the recorded data analyzing unit 40 in the first embodiment includes a candidate value calculating unit 42 and an analysis processing unit 44. For each of N recorded data pairs P12 to PN1 each formed by two pieces of recorded data Xi and Xj that are adjacent to each other when the N pieces of recorded data X1 to XN are arranged cyclically, the candidate value calculating unit 42 calculates a plurality of candidate values for a time difference between audio signals (an example of time signals) in the two respective pieces of recorded data Xi and Xj of the recorded data pair Pij. One of the plurality of candidate values calculated for the recorded data pair Pij is selected as a final time difference Oij.

Specifically, for each of the N recorded data pairs P12 to PN1, the candidate value calculating unit 42 calculates a plurality of candidate values according to an audio signal cross-correlation Cij(τ) between the recorded data Xi and the recorded data Xj. In the first embodiment, the plurality of candidate values are calculated according to an absolute value |Cij(τ)| of the cross-correlation Cij(τ). As expressed by the following Equation (1), the cross-correlation Cij(τ) is a numerical string indicating a degree of time waveform correlation between an audio signal yi(t) included in the recorded data Xi and an audio signal yj(t) included in the recorded data Xj with a time difference (amount of shift on the time axis) τ of the audio signal yj(t) to the audio signal yi(t) as a variable after a starting point of the audio signal yi(t) and a starting point of the audio signal yj(t) are made to coincide with each other on the time axis. Incidentally, the time difference τ can assume a negative numerical value. Hence, for example, when the recorded data Xj is positioned in the rear of the recorded data Xi on the time axis, the time difference Oij is a positive number, and when the recorded data Xj is positioned in front of the recorded data Xi on the time axis, the time difference Oij is a negative number. Incidentally, the plurality of candidate values may be calculated without depending on the absolute value of the cross-correlation Cij(τ).

[Math. 1]

$$C_{ij}(\tau) = \frac{1}{N+1} \sum_{t=0}^{N} y_i(t) y_j(t+\tau) \quad (1)$$

In addition, as expressed by Equation (2), the cross-correlation Cij(τ) can also be calculated by an inverse Fourier transform (IFFT) of a cross spectrum of a frequency spectrum Yi(f) of the audio signal yi(t) and a frequency spectrum Yj(f) of the audio signal yj(t). f denotes frequency. Yi*(f) is a complex conjugate of Yi(f). A configuration that calculates the cross-correlation Cij(τ) by operation of Equation (2) has an advantage of being able to reduce an amount of calculation in calculating the cross-correlation Cij(τ) as compared with a configuration that calculates Equation (1).

[Math. 2]

$$C_{ij}(\tau) = \mathrm{IFFT}(Y^*_i(f) Y_j(f)) \quad (2)$$

Figure 3:
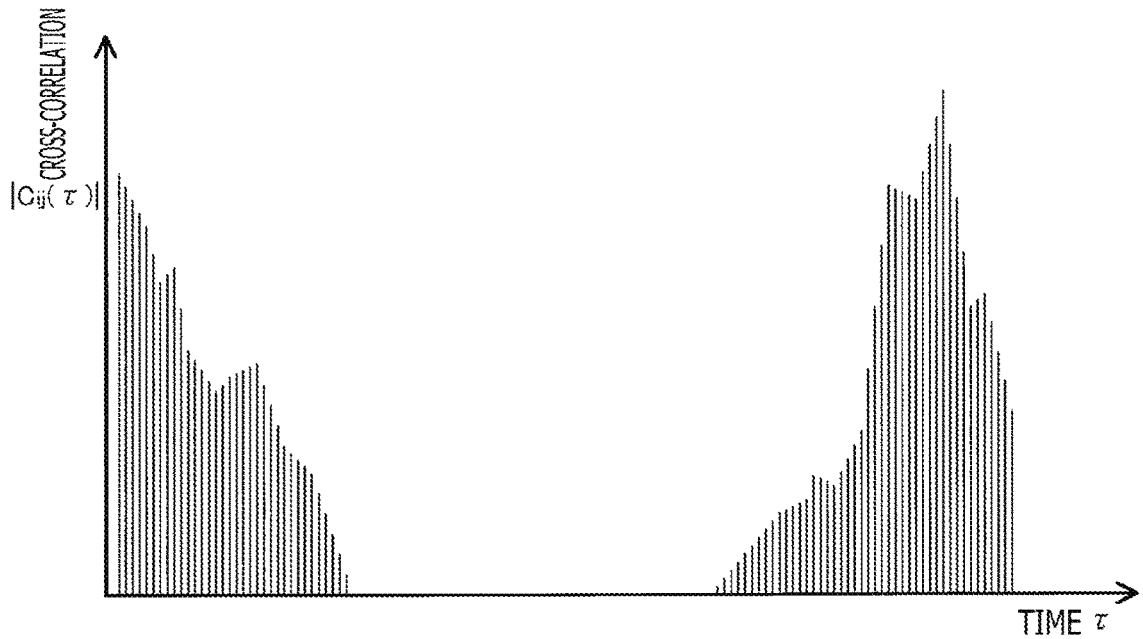
FIG. 3 is a diagram of assistance in explaining the absolute value of cross-correlation of a recorded data pair.

FIG. 3 is a diagram of assistance in explaining the absolute value |Cij(τ)| of the cross-correlation Cij(τ) calculated for one arbitrary recorded data pair Pij. The higher the correlation between the time waveform of the audio signal yi(t) and the time waveform of the audio signal yj(t), the larger the value that the absolute value |Cij(τ)| can assume. The recording periods of the recorded data X partly overlap each other on the time axis, as described earlier. Thus, the audio included in each piece of recorded data X includes an audio (performance audio of a musical piece for stage performance) component partly common on the time axis. Hence, a time difference τ maximizing the absolute value |Cij(τ)| of the cross-correlation Cij(τ) of the recorded data pair Pij can be the time difference Oij of the corresponding recorded data. In actuality, however, in a case where the audio included in the recorded data X includes noise, for example, there is a possibility of an error occurring when the time difference τ maximizing the absolute value |Cij(τ)| of the cross-correlation Cij(τ) is determined as the time difference Oij of the recorded data pair Pij. In order to solve this problem, the first embodiment adopts a configuration that identifies one of a plurality of candidate values D calculated according to the cross-correlation Cij(τ) as the time difference Oij between the two pieces of recorded data Xi and Xj.

Figure 4:
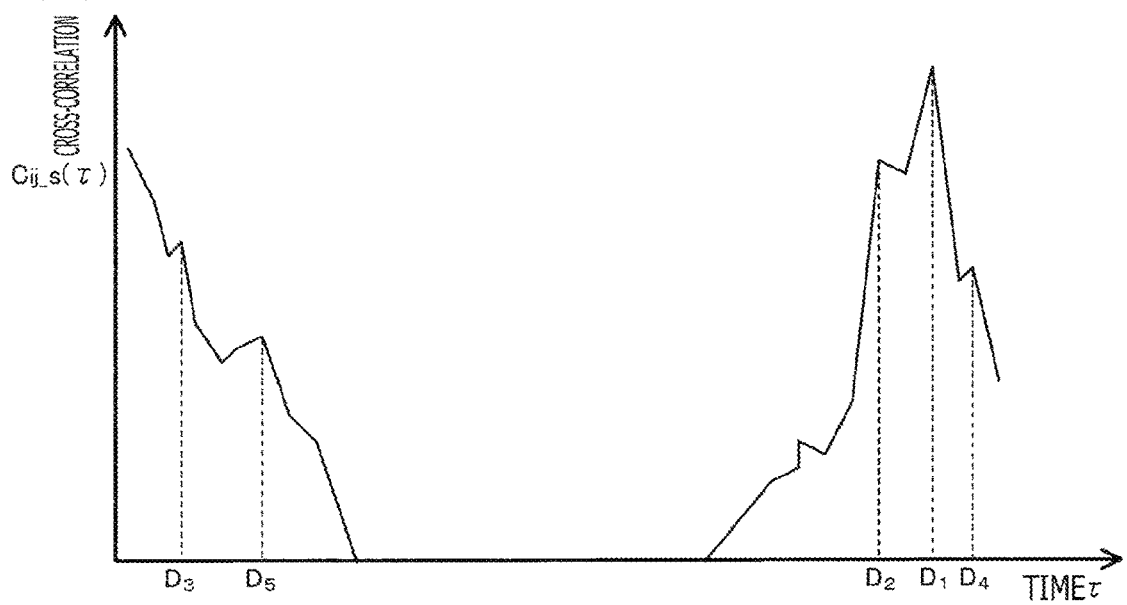
FIG. 4 is a diagram of assistance in explaining the cross-correlation after smoothing.

In calculating the plurality of candidate values D, specifically, the candidate value calculating unit 42 smooths the absolute value |Cij(τ)| of the calculated cross-correlation Cij(τ). For smoothing the absolute value |Cij(τ)| of the calculated cross-correlation Cij(τ), for example, the candidate value calculating unit 42 includes a function of a moving average calculation. The candidate value calculating unit 42 identifies M candidate values D (M is a natural number of two or more) from cross-correlation Cij_s(τ) after the smoothing. FIG. 4 is a diagram of assistance in explaining the cross-correlation Cij_s(τ) after the smoothing. As illustrated in FIG. 4, the M candidate values D (D1, D2, . . . , DM) are a plurality of time differences τ corresponding to M respective maxima in the cross-correlation Cij_s(τ), and are a plurality of candidate values for the time difference Oij of the recorded data pair Pij. The M maxima are, among a plurality of maxima, for example, maxima up to an Mth maximum in descending order of maximal values or M maxima whose maximal values exceed a threshold value. When the M maxima exceeding the threshold value are identified, a total number M of candidate values D can differ for each recorded data pair Pij. Incidentally, the threshold value is selected empirically or statistically. The total number M of candidate values D is arbitrary. The smaller the total number of candidate values D is, the more a processing load on the electronic controller 22 can be reduced.

As illustrated in FIG. 3, the absolute value |Cij(τ)| of the cross-correlation Cij(τ) locally tends to be a large numerical value in a range around the time difference τ maximizing the absolute value |Cij(τ)|. Hence, if the M candidate values D of the time difference Oij are calculated in descending order of the absolute value |Cij(τ)| of the cross-correlation Cij(τ) without smoothing, in a case where the absolute value |Cij(τ)| of the cross-correlation Cij(τ) locally increases due, for example, to noise or the like, there is a possibility of a plurality of candidate values D being locally identified from the vicinity thereof. In the first embodiment, as illustrated in FIG. 4, the plurality of time differences τ corresponding to the respective maxima of the cross-correlation Cij_s(τ) after smoothing are identified as a plurality of candidate values D. The plurality of candidate values D are therefore dispersed. That is, even when the absolute value |Cij(τ)| of the cross-correlation Cij(τ) becomes a maximum due, for example, to noise or the like, it is possible to identify the plurality of candidate values D so as to include a proper time difference Oij between the two pieces of recorded data Xi and Xj (in turn, identify the time difference Oij with high accuracy). Needless to say, when the localization of the plurality of candidate values D does not present a particular problem, the plurality of candidate values D can also be identified from the absolute value |Cij(τ)| of the cross-correlation Cij(τ). As described above, the first embodiment calculates the plurality of candidate values D according to the cross-correlation Cij(τ) between the audio signals y(t) of the recorded data pair Pij, and therefore has an advantage of being able to simply calculate the plurality of candidate values D for the time difference τ between the pieces of recorded data X as compared with a configuration that calculates the plurality of candidate values D according to an index other than the cross-correlation $Cij(\tau)$.

For each of the N recorded data pairs P12 to PN1, the analysis processing unit 44 in FIG. 1 identifies one of the M candidate values D as the time difference Oij between the two pieces of recorded data Xi and Xj in the recorded data pair Pij.

As is understood from FIG. 2, a total value S (S=O12+ O23+ . . . +ON1) of proper time differences O12 to ON1 over the N recorded data pairs P12 to PN1 is zero. Hence, a combination of candidate values D whose total value S is close to zero can be evaluated as being close to actual time differences. That is, the total value S of N candidate values D identified for the N respective recorded data pairs P12 to PN1 can be used as an index indicating a degree of reliability of the candidate values D.

Specifically, over the N recorded data pairs P12 to PN1, the analysis processing unit 44 calculates a total value S of N candidate values Dm for all combinations in which one candidate value Dm is selected from M candidate values D of each recorded data pair Pij (that is, combinations of N candidate values Dm), and identifies a combination of candidate values Dm whose total value S is closest to zero (that is, a combination of candidate values Dm in which the absolute value of the total value S thereof is a minimum). The analysis processing unit 44 determines the N respective candidate values Dm included in the identified combination as time differences O12 to ON1 of the N recorded data pairs P12 to PN1. As is understood from the above description, the analysis processing unit 44 functions as an element that identifies one of the plurality of candidate values D in each of the N recorded data pairs P12 to PN1 as the time difference Oij between the two pieces of recorded data Xi and Xj in the recorded data pair Pij such that a numerical value (total value S) obtained by summing one of the plurality of candidate values D calculated for each of the N recorded data pairs P12 to PN1 over the N recorded data pairs P12 to PN1 approaches zero.

The edit processing unit 46 generates content Z in which the N pieces of recorded data X1 to XN are synchronized with each other according to the N time differences O12 to ON1 determined by the analysis processing unit 44. The synchronization of the recorded data X means a state in which the time axes of audio and video of the respective pieces of recorded data X are made to coincide with each other in the N pieces of recorded data X1 to XN. Specifically, the edit processing unit 46 adjusts the position on the time axis of each piece of recorded data X such that a specific time in each piece of recorded data X is a common time point on the time axis over the N pieces of recorded data X1 to XN. That is, as illustrated in FIG. 2, the position on the time axis of each piece of recorded data X is adjusted such that the time difference between the recorded data Xi and the recorded data Xj is the time difference Oij calculated by the analysis processing unit 44.

The content Z generated by the edit processing unit 46 in FIG. 1 is reproduced according to an instruction of the electronic controller 22. Specifically, the video of the content Z is displayed by the display device 32, and the audio of the content Z is emitted by the audio emitting device 34.

Figure 5:
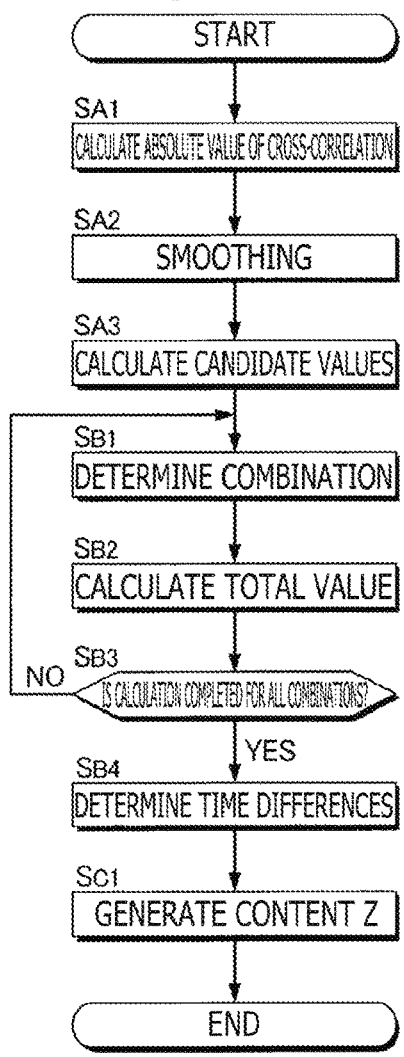
FIG. 5 is a flowchart of a process for generating content by an electronic controller.

FIG. 5 is a flowchart of processing in which the electronic controller 22 generates content Z. The processing of FIG. 5 is started by being triggered by an instruction from a user to the operating device 36. In a case where there are, for example, four pieces of recorded data X1 to X4 obtained by recording a state of a play performed on a stage from mutually different positions, when the processing of FIG. 5 is started, the candidate value calculating unit 42 calculates the absolute value $|Cij(\tau)|$ of cross-correlation $Cij(\tau)$ between the audio signal yi(t) of the recorded data Xi and the audio signal yj(t) of the recorded data Xj for each of four recorded data pairs P12, P23, P34, and P41 (SA1). The candidate value calculating unit 42 smooths the absolute value $|Cij(\tau)|$ of the cross-correlation $Cij(\tau)$ which absolute value is calculated for each of the four recorded data pairs Pij (SA2). For each cross-correlation $Cij\_s(\tau)$ after the smoothing of the four recorded data pairs P12 to P41, the candidate value calculating unit 42 identifies five time differences $\tau$ corresponding to respective maxima up to a fifth (that is, M=5) maximum in descending order as five candidate values D (D1 to D5) (SA3). Steps SA1 to SA3 are processing of calculating the plurality of candidate values D.

Over the four recorded data pairs P12 to P41, the analysis processing unit 44 determines one arbitrary combination from all combinations in which one candidate value Dm is selected from the five candidate values D of each recorded data pair P (that is, combinations of four candidate values Dm) (SB1). The analysis processing unit 44 calculates a total value S of the four candidate values Dm in the determined combination (SB2). The analysis processing unit 44 repeats the processing of step SB1 and step SB2 until completing the calculation of total values S for all the combinations (SB3: NO). When calculating the total values S of all the combinations (SB3: YES), the analysis processing unit 44 determines the four candidate values Dm corresponding to a total value S that is closest to zero among the total values S of all the combinations as respective time differences O12, O23, O34, and O41 of the four respective recorded data pairs P12 to P41 (SB4). Steps SB1 to SB4 are processing of identifying the respective time differences O12 to O41 of the four recorded data pairs P12 to P41.

The edit processing unit 46 generates content Z by edit processing that synchronizes the four pieces of recorded data X1 to X4 with each other according to the time differences O12 to O41 identified by the analysis processing unit 44 (SC1).

As is understood from the above description, in the first embodiment, one of the plurality of candidate values D in each of the N recorded data pairs P12 to PN1 is identified as the time difference Oij between the two pieces of recorded data Xi and Xj in the recorded data pair Pij such that the total value S of candidate values Dm for the time differences $\tau$ over the N recorded data pairs P12 to PN1 approaches zero. Hence, the time difference Oij between the pieces of recorded data X can be identified with high accuracy as compared with a configuration that adopts the sole time difference $\tau$ identified from the two pieces of recorded data Xi and Xj as a final value (time difference Oij), for example, a configuration that determines the time difference $\tau$ maximizing the time signal cross-correlation $Cij(\tau)$ between the two pieces of recorded data Xi and Xj as the time difference Oij between the pieces of recorded data X. That is, it is possible to reduce an error between the time difference Oij between the pieces of recorded data X and an actual time difference.

Second Embodiment

The second embodiment will be described. In each of the embodiments illustrated in the following, elements that have the same actions or functions as in the first embodiment have been assigned the same reference symbols as those used to describe the first embodiment, and the detailed descriptions thereof have been appropriately omitted.

Figure 6:
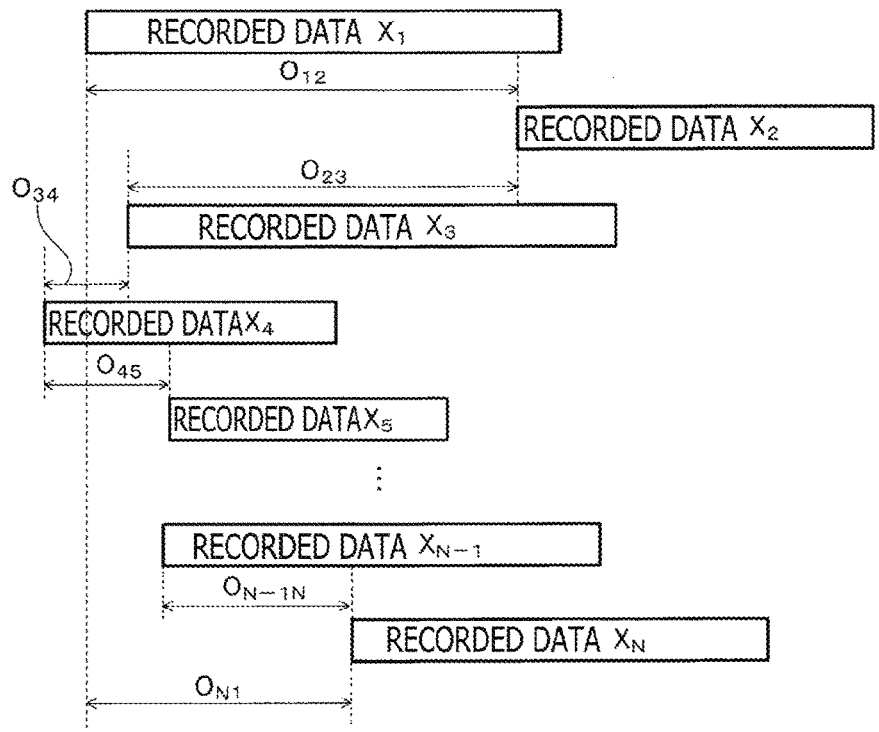
FIG. 6 is a diagram of assistance in explaining time differences in N recorded data pairs according to a second embodiment.

FIG. 6 is a diagram of assistance in explaining N time differences O12 to ON1 in N respective recorded data pairs P12 to PN1 according to the second embodiment. The first embodiment illustrates a case where the recording periods of all of the N pieces of recorded data X1 to XN partly overlap each other on the time axis. The second embodiment assumes a possibility that two pieces of recorded data Xi and Xj selected from N pieces of recorded data do not overlap each other on the time axis. For example, recorded data X2 in FIG. 6 partly overlaps recorded data X1, but does not overlap recorded data X5 on the time axis.

Figure 7:
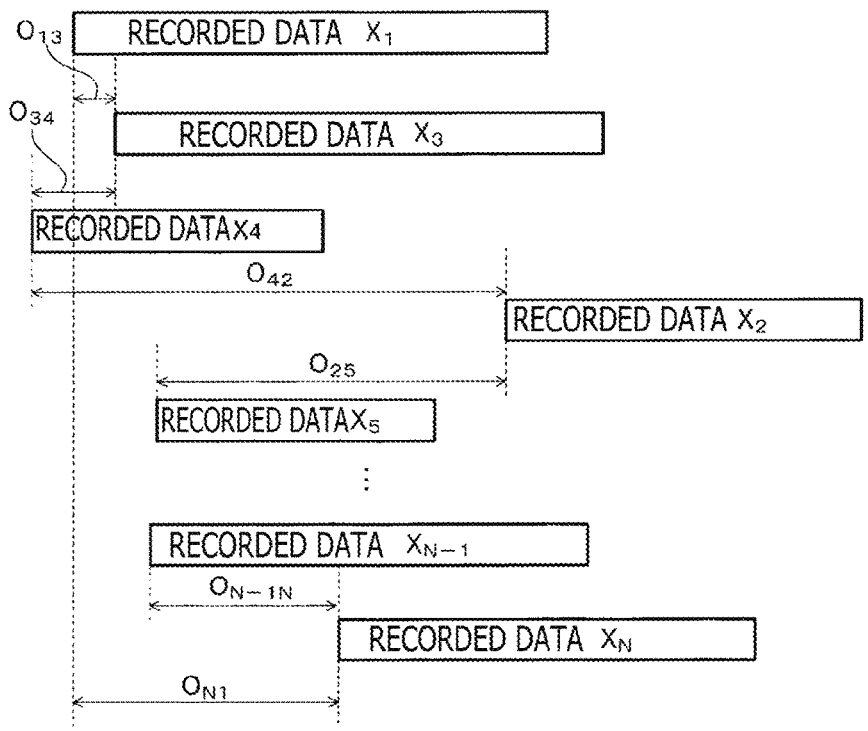
FIG. 7 is a diagram of assistance in explaining time differences in a different permutation of the N recorded data pairs.

Here, in a case of a recorded data pair Pij in which recorded data Xi and recorded data Xj do not partly overlap on the time axis, that is, in a case where an actual time difference of the recorded data pair Pij exceeds the time length of the recorded data Xi, the cross-correlation Cij($\tau$) of the recorded data pair Pij does not assume a significant value. Hence, candidate values D identified from the cross-correlation Cij($\tau$) are not significant values either. As is understood from FIG. 6, even in the case where the recorded data Xi and the recorded data Xj do not partly overlap each other on the time axis, when N pieces of recorded data X1 to XN are arranged such that the two pieces of recorded data Xi and Xj adjacent to each other overlap each other on the time axis, a total value S of the N time differences O12 to ON1 over the N recorded data pairs P12 to PN1 is a numerical value close to zero, as described in the first embodiment. However, when the N pieces of recorded data X1 to XN are arranged such that the two pieces of recorded data Xi and Xj not overlapping each other on the time axis are adjacent to each other as in relation between the recorded data X2 and the recorded data X5 in FIG. 7, the total value S of the N time differences O12 to ON1 is a numerical value deviating from zero. That is, in the second embodiment, the propriety of candidate values D can differ according to the order of arrangement of the N pieces of recorded data X1 to XN. Accordingly, in the second embodiment, the total value S of the candidate values D of the recorded data pairs P12 to PN1 is calculated for each of K permutations Q1 to QK in which the order of arrangement of the N pieces of recorded data X1 to XN is made to differ.

As in the first embodiment, a recorded data analyzing unit 40 in the second embodiment includes a candidate value calculating unit 42 and an analysis processing unit 44. When the N pieces of recorded data X1 to XN are cyclically arranged in the K permutations (circular permutations) Q1 to QK, the N recorded data pairs P12 to PN1 each formed by two pieces of recorded data Xi and Xj adjacent to each other are identified. For each of the N recorded data pairs P12 to PN1 in each of the permutations Q1 to QK, the candidate value calculating unit 42 in the second embodiment calculates M candidate values D1 to DM for a time difference $\tau$ between audio signals y(t) in the two respective pieces of recorded data Xi and Xj of the recorded data pair Pij. The candidate value calculating unit 42 in the first embodiment does not need to consider a plurality of permutations Q in calculating the candidate values D, but calculates the candidate values D of the recorded data pair Pij only for one arbitrary permutation. On the other hand, the candidate value calculating unit 42 in the second embodiment calculates the candidate values D of each recorded data pair Pij for each of the K permutations Q1 to QK. As in the first embodiment, the plurality of candidate values D are calculated according to the absolute value |Cij($\tau$)| of the audio signal cross-correlation Cij($\tau$) between the recorded data Xi and the recorded data Xj for each of the N recorded data pairs P12 to PN1.

As in the first embodiment, for each of the N recorded data pairs P12 to PN1, the analysis processing unit 44 in the second embodiment identifies one of the M candidate values D as the time difference Oij between the two pieces of recorded data Xi and Xj in the recorded data pair Pij. Specifically, as in the first embodiment, for each of the K permutations Q1 to QK, the analysis processing unit 44 calculates the total value S of the N candidate values Dm in all combinations in which one candidate value Dm is selected from the M candidate values D of each recorded data pair Pij. Then, the analysis processing unit 44 identifies a combination of candidate values Dm whose total value S is closest to zero among the total values S calculated for the respective combinations of candidate values D for each of the K permutations Q1 to QK, and determines the N candidate values Dm included in the combination as the respective time differences Oij of the N recorded data pairs Pij. As is understood from the above description, the analysis processing unit 44 functions as an element that identifies one of the plurality of candidate values D in each of the N recorded data pairs P12 to PN1 in one of the K permutations Q1 to QK as the time difference Oij between the two pieces of recorded data Xi and Xj in the recorded data pair Pij such that a numerical value (total value S) obtained by summing, over the N recorded data pairs P12 to PN1, one of the plurality of candidate values D calculated for each of the K permutations Q1 to QK approaches zero. As in the first embodiment, the edit processing unit 46 generates content Z in which the N pieces of recorded data X1 to XN are synchronized with each other according to the N time differences O12 to ON1 determined by the analysis processing unit 44.

Figure 8:
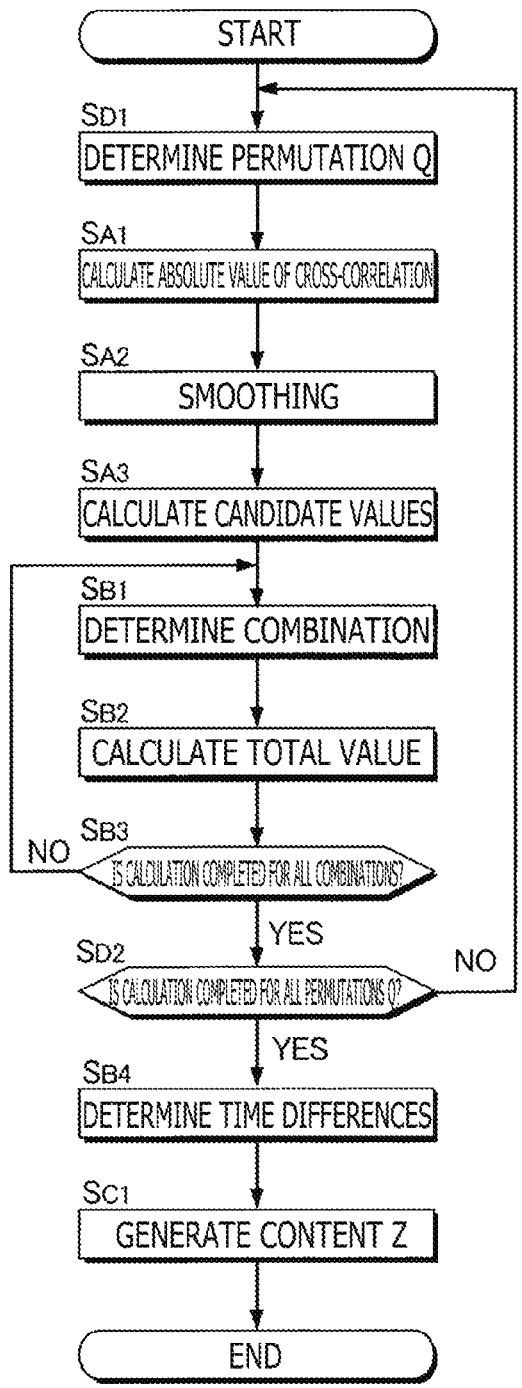
FIG. 8 is a flowchart of processing in which an electronic controller generates content.

FIG. 8 is a flowchart of processing in which the electronic controller 22 generates content Z. The processing of FIG. 8 is started by being triggered by an instruction from a user to the operating device 36. In a case where there are, for example, four pieces of recorded data X1 to X4 obtained by recording a state of a play performed on a stage from mutually different positions, when the processing of FIG. 8 is started, the candidate value calculating unit 42 determines one arbitrary permutation Q from six permutations Q1 to Q6 in which the four pieces of recorded data X are cyclically arranged (SD1). For the determined permutation Q, as in the first embodiment, the recorded data analyzing unit 40 (the candidate value calculating unit 42 and the analysis processing unit 44) performs processing from the processing of calculating the absolute value |Cij($\tau$)| of the cross-correlation Cij($\tau$) for each of the four recorded data pairs Pij (SA1) to the processing of calculating a total value S of candidate values Dm (SB2).

The analysis processing unit 44 repeats the processing of steps SB1 and SB2 until the calculation of the total value S is completed for all combinations of candidate values Dm (SB3: NO). When the total values S of all the combinations are calculated (SB3: YES), the candidate value calculating unit 42 determines whether the calculation of the total values S of all the combinations of the candidate values Dm (steps SA1 to SB2) is completed for all the permutations Q1 to Q6 in which the four pieces of recorded data X are arranged (SD2). When the total values S are calculated for all the permutations Q1 to Q6 (SD2: YES), the analysis processing unit 44 determines four candidate values Dm corresponding to a total value S closest to zero among the total values S of all the combinations in all the permutations Q1 to Q6 as four respective time differences Oij corresponding to the four recorded data pairs Pij (SB4). When the calculation of the total values S is not completed for all the permutations Q1 to Q6 (SD2: NO), the candidate value calculating unit 42 selects an unprocessed permutation Q anew (SD1), and repeats the processing of steps SA1 to SB3. The edit processing unit 46 generates content Z as in the first embodiment (SC1).

As is understood from the above description, the candidate value calculating unit 42 performs the processing of determining a permutation Q of the N pieces of recorded data X1 to XN (steps SD1 and SD2) and the processing of calculating the M candidate values D (steps SA1 to SA3), and the analysis processing unit 44 performs the processing of identifying four time differences Oij corresponding to the four respective recorded data pairs Pij (steps SB1 to SB3 and step SB4).

The second embodiment also achieves effects similar to those of the first embodiment. The second embodiment can particularly identify the time differences Oij properly even when not all of the recording periods of the pieces of recorded data X partly overlap each other on the time axis. Incidentally, the time differences Oij can be identified by the configuration illustrated in the second embodiment also in the case illustrated in the first embodiment in which case the recording periods of all the pieces of recorded data X1 to XN partly overlap each other on the time axis.

<Modifications>

Each of the embodiments illustrated above can be modified in various manners. Modifications will be illustrated in the following. Two or more modifications arbitrarily selected from the following illustrations can be integrated with each other as appropriate within a scope where no mutual inconsistency arises.

(1) In each of the foregoing embodiments, the plurality of candidate values D are calculated according to the time difference $\tau$ between the audio signals y(t) included in the respective pieces of recorded data Xi and Xj of the recorded data pair Pij. However, the signals used for the calculation of the time difference $\tau$ are not limited to the audio signals y(t). For example, when the audio of each of the pieces of recorded data X includes common utterance contents, the plurality of candidate values D can also be calculated by analyzing the utterance contents of the respective pieces of recorded data X by voice recognition, and comparing a result of the analysis between the two pieces of recorded data Xi and Xj. In addition, the plurality of candidate values D may be calculated by comparing (for example, calculating the cross-correlation Cij($\tau$)), between the two pieces of recorded data Xi and Xj, signals indicating temporal changes in a feature quantity (for example, pitch) extracted from the audio signals y(t). Further, the plurality of candidate values D can also be calculated by generating signals indicating temporal changes in lightness of video included in the recorded data pair Pij, for example, from video signals representing temporal changes in the video, and comparing the signals between the two pieces of recorded data Xi and Xj. That is, the plurality of candidate values D can also be calculated by using signals of some kind which signals are generated from signals (audio signals and video signals) representing temporal changes of the recording target. As is understood from the above description, the signals used to calculate the plurality of candidate values D are comprehensively expressed as time signals representing temporal changes of the recording target (audio or video) in the two respective pieces of recorded data X of the recorded data pair Pij. That is, the concept of the time signals includes not only signals (audio signals and video signals) representing temporal changes of the recording target itself but also signals representing temporal changes in feature quantities of the recording target (signals indirectly representing temporal changes of the recording target). However, in consideration of a tendency for the audio signals y(t) to have small differences in temporal variation according to a recording condition (for example, capturing positions), the configuration of each of the foregoing embodiments using the audio signals y(t) has an advantage of being able to identify the N time differences O12 to ON1 between the N pieces of recorded data X1 to XN with high accuracy as compared with a configuration using time signals such as video or the like.

(2) In each of the foregoing embodiments, the plurality of candidate values D of the recorded data pair Pij are calculated according to the cross-correlation Cij($\tau$). However, the index used for the calculating of the plurality of candidate values D is not limited to the cross-correlation Cij($\tau$). For example, the plurality of candidate values D of the recorded data pair Pij can also be calculated according to a normalized cross-correlation. The index used for the calculation of the plurality of candidate values D is arbitrary as long as the time difference can be calculated between time signals representing temporal changes of the recording target in the two respective pieces of recorded data Xi and Xj of the recorded data pair Pij.

(3) In each of the foregoing embodiments, the edit processing unit 46 is incorporated in the recorded data editing system 10. However, the edit processing unit 46 can also be incorporated in a server device or a terminal device separate from the recorded data editing system 10. In this case, the recorded data editing system 10 transmits the N pieces of recorded data X1 to XN and the N time differences O12 to ON1 identified by the analysis processing unit 44 to the server device or the terminal device. As is understood from the above description, the recorded data editing system 10 in each of the foregoing embodiments is an illustration of a device (that is, a recorded data analyzing device) including the recorded data analyzing unit 40 that analyzes the N time differences O12 to ON1 for the N pieces of recorded data X1 to XN. Edit processing (the edit processing unit 46) is not essential in the recorded data processing device according to the some embodiments.

(4) In each of the foregoing embodiments, the time differences Oij are identified for all the pieces of recorded data X obtained from the plurality of recording devices 12. However, it is also possible to analyze the time differences Oij for a part of the pieces of recorded data X obtained from the plurality of recording devices 12. For example, the recorded data analyzing unit 40 obtains time information indicating a recording period (for example, a start time and an end time) of each piece of recorded data X from each of the recording devices 12 together with the recorded data X, identifies N pieces of recorded data X1 to XN whose recording times indicated by the time information overlap each other on the time axis, and performs operation similar to that of the first embodiment. The candidate value calculating unit 42 functions as an element that calculates a plurality of candidate values D for each of the N recorded data pairs P12 to PN1 of the N pieces of recorded data X1 to XN that overlap each other on the time axis among the plurality of pieces of recorded data X. That is, recorded data X estimated not to overlap the other recorded data X on the time axis from the time information is excluded from processing targets. Incidentally, while temporal relation (time difference Oij) between the pieces of recorded data X can also be identified from the time information, times measured by the recording devices 12 can actually have errors in the respective recording devices 12. There is thus a meaning in identifying the time difference Oij by the configuration in each of the foregoing embodiments. The above configuration can exclude the recorded data X not overlapping the other recorded data X on the time axis from processing targets, and therefore reduce a processing load on the recorded data analyzing unit 40 as compared with the configuration that sets all the pieces of recorded data X generated by the recording devices 12 as processing targets.

(5) The recorded data analyzing unit 40 illustrated in each of the foregoing embodiments is implemented by cooperation between the electronic controller 22 and a program, as described above. The program can be provided in a form of being stored on a recording medium readable by a computer, and installed on the computer. The recording medium is, for example, a non-transitory recording medium. An optical recording medium (optical disk) such as a compact disc read only memory (CD-ROM) or the like is a good example of the recording medium. However, the recording medium can include publicly known arbitrary types of recording media such as a semiconductor recording medium, a magnetic recording medium, and the like. It is to be noted that the non-transitory recording medium includes arbitrary recording media excluding transitory propagating signals, and does not exclude volatile recording media. In addition, the program can also be provided to a computer in a form of distribution via a communication network.

(6) In some embodiments can also be identified as an operating method (recorded data processing method) of the recorded data analyzing unit 40 according to each of the foregoing embodiments. Specifically, in a recorded data processing method according to some embodiments, for each of N (N is a natural number of three or more) recorded data pairs P12 to PN1 each formed by two pieces of recorded data Xi and Xj that are adjacent to each other when N pieces of recorded data X each representing a recording target including at least one of audio and video are cyclically arranged, a plurality of candidate values D are calculated for a time difference between time signals representing temporal changes of the recording target in the two respective pieces of recorded data Xi and Xj of the recorded data pair Pij, and one of the plurality of candidate values D in each of the N recorded data pairs Pij is identified as the time difference Oij between the two pieces of recorded data Xi and Xj in the recorded data pair Pij such that a numerical value obtained by summing, over the N recorded data pairs P12 to PN1, one of the plurality of candidate values D calculated for each of the N recorded data pairs P12 to PN1 approaches zero.

(7) For example, the following configurations may be understood from the embodiments exemplified above.

A recorded data processing method according to one aspect includes: calculating, for each of N (N is a natural number of three or more) recorded data pairs each formed by two pieces of recorded data that are adjacent to each other when N pieces of recorded data each representing a recording target including at least one of audio and video are arranged cyclically, a plurality of candidate values for a time difference between time signals representing temporal changes of the recording target in the two respective pieces of recorded data of the recorded data pair; and identifying one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero. The above method identifies one of the plurality of candidate values in each of the N recorded data pairs as the time difference between the two pieces of recorded data in the recorded data pair such that the numerical value obtained by summing, over the N recorded data pairs, one of the plurality of candidate values calculated for each of the N recorded data pairs each representing the recording target including the at least one of the audio and the video approaches zero. With a method of adopting a sole time difference identified from between the two pieces of recorded data as a final value, for example, a method of determining a time difference maximizing time signal cross-correlation between the two pieces of recorded data as the time difference between the pieces of recorded data, there is a possibility of an error occurring in the time difference between the pieces of recorded data when noise is included in the time signals. In the foregoing aspect, one of the plurality of candidate values is identified as the time difference between the two pieces of recorded data for each recorded data pair, and therefore the time difference between the pieces of recorded data can be identified with high accuracy. That is, it is possible to reduce an error between the time difference between the pieces of recorded data and an actual time difference.

In the recorded data processing method according to another aspect, in the calculating of the plurality of candidate values, the plurality of candidate values of each of the recorded data pairs are calculated according to a cross-correlation between the time signals in the two pieces of recorded data of the recorded data pair. The above method calculates the plurality of candidate values for the time difference between the two pieces of recorded data according to the cross-correlation between the time signals. Hence, the plurality of candidate values for the time difference between the pieces of recorded data can be calculated simply as compared with a method of calculating the plurality of candidate values according to an index other than the cross-correlation.

In the recorded data processing method according to another aspect, in the calculating of the plurality of candidate values, a plurality of time differences corresponding to respective maxima when an absolute value of the cross-correlation between the time signals in the two pieces of recorded data is smoothed are identified as the plurality of candidate values. The above method calculates the plurality of candidate values for the time difference by smoothing the absolute value of the cross-correlation calculated for the two pieces of recorded data adjacent to each other. With a method of calculating the plurality of candidate values for the time difference in descending order of numerical values of the absolute value of the cross-correlation without smoothing, the plurality of candidate values can be localized within a range around a time difference maximizing the absolute value of the cross-correlation, and therefore in a case where the cross-correlation locally increases due, for example, to noise or the like, there is a possibility of a plurality of candidate values being locally identified from the vicinity thereof. According to the foregoing method of identifying the plurality of time differences corresponding to the respective maxima when the absolute value of the cross-correlation is smoothed as the plurality of candidate values, the plurality of candidate values are dispersed. Thus, even when the cross-correlation becomes a maximum due, for example, to noise or the like, the plurality of candidate values can be identified so as to include a proper time difference between the two pieces of recorded data (in turn, the time difference can be identified with high accuracy).

In the recorded data processing method according to another aspect, the time signals are audio signals representing temporal changes in the audio. The above method calculates the plurality of candidate values for the time difference between the audio signals. Hence, because time signals representing temporal changes of video or the like have large differences in temporal variation according to a recording condition (for example, photographing positions), but the audio signals have small differences in temporal variation according to the recording condition, there is an advantage of being able to identify time differences between a plurality of pieces of recorded data with high accuracy.

In the recorded data processing method according to another aspect, in the calculating of the candidate values, the plurality of candidate values are calculated for each of the N recorded data pairs in the N pieces of recorded data overlapping each other on a time axis among a plurality of pieces of recorded data. The above method calculates the plurality of candidate values for each of the N recorded data pairs in the N pieces of recorded data overlapping each other on the time axis among the plurality of pieces of recorded data. Hence, processing can be performed which calculates the time difference of the recorded data pair after excluding recorded data not overlapping the other recorded data on the time axis. It is therefore possible to reduce a load of processing of calculating the time difference of the recorded data pair.

In the recorded data processing method according to another aspect, in the calculating of the plurality of candidate values, the plurality of candidate values in each of the N recorded data pairs are calculated for each of K permutations in cyclic arrangements of the N pieces of recorded data, and one of the plurality of candidate values in each of the N recorded data pairs in one of the K permutations is identified as the time difference between the two pieces of recorded data in the recorded data pair such that a numerical value obtained by summing, over the N recorded data pairs, one of the plurality of candidate values calculated for each of the K permutations approaches zero. The above method identifies one of the plurality of candidate values in each of the N recorded data pairs in one of the K permutations as the time difference between the two pieces of recorded data in the recorded data pair such that the numerical value obtained by summing, over the N recorded data pairs, one of the plurality of candidate values calculated for each of the K permutations approaches zero. Hence, the time difference can be identified properly even when not all of the recording periods of the N pieces of recorded data partly overlap each other on the time axis.

In the recorded data processing method according to another aspect, the N pieces of recorded data are synchronized with each other according to the time difference identified for each of the N recorded data pairs, and content is generated from the N synchronized pieces of recorded data. The above configuration can synchronize the N pieces of recorded data with each other according to the time difference identified for each of the N recorded data pairs, and generate the content from the N synchronized pieces of recorded data.

A recorded data processing device according to one aspect includes: a candidate calculating unit configured to, for each of N (N is a natural number of three or more) recorded data pairs each formed by two pieces of recorded data that are adjacent to each other when N pieces of recorded data each representing a recording target including at least one of audio and an video are arranged cyclically, calculate a plurality of candidate values for a time difference between time signals representing temporal changes of the recording target in the two respective pieces of recorded data of the recorded data pair; and an analysis processing unit configured to identify one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero. The above configuration identifies one of the plurality of candidate values in each of the N recorded data pairs as the time difference between the two pieces of recorded data in the recorded data pair such that the numerical value obtained by summing, over the N recorded data pairs, one of the plurality of candidate values calculated for each of the N recorded data pairs each representing the recording target including the at least one of the audio and the video approaches zero. With a configuration that adopts a sole time difference identified from between the two pieces of recorded data as a final value, for example, a configuration that determines a time difference maximizing time signal cross-correlation between the two pieces of recorded data as the time difference between the pieces of recorded data, there is a possibility of an error occurring in the time difference between the pieces of recorded data when noise is included in the time signals. In the foregoing aspect, one of the plurality of candidate values is identified as the time difference between the two pieces of recorded data for each recorded data pair, and therefore the time difference between the pieces of recorded data can be identified with high accuracy. That is, it is possible to reduce an error between the time difference between the pieces of recorded data and an actual time difference.

What is claimed is:

1. A recorded data processing method comprising:
    calculating, for each of N (N is a natural number of three or more) recorded data pairs each formed by two pieces of recorded data that are adjacent to each other when N pieces of recorded data each representing a recording target including at least one of audio and video are arranged cyclically, a plurality of candidate values for a time difference between time signals representing temporal changes of the recording target in the two respective pieces of recorded data of the recorded data pair; and
    identifying one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero.

2. The recorded data processing method according to claim 1, wherein
    in the calculating of the plurality of candidate values, the plurality of candidate values of each of the recorded data pairs are calculated according to a cross-correlation between the time signals in the two pieces of recorded data of the recorded data pair.

3. The recorded data processing method according to claim 2, wherein
    in the calculating of the plurality of candidate values, a plurality of time differences corresponding to respective maxima when an absolute value of the cross-correlation between the time signals in the two pieces of recorded data is smoothed are identified as the plurality of candidate values.

4. The recorded data processing method according to claim 1, wherein
the time signals are audio signals representing temporal changes in the audio.

5. The recorded data processing method according to claim 1, wherein
in the calculating of the plurality of candidate values, the plurality of candidate values are calculated for each of the N recorded data pairs in the N pieces of recorded data overlapping each other on a time axis among a plurality of pieces of recorded data.

6. The recorded data processing method according to claim 1, wherein
in the calculating of the plurality of candidate values, the plurality of candidate values in each of the N recorded data pairs are calculated for each of K permutations in cyclic arrangements of the N pieces of recorded data, and
one of the plurality of candidate values in each of the N recorded data pairs in one of the K permutations is identified as the time difference between the two pieces of recorded data in the recorded data pair such that a numerical value obtained by summing, over the N recorded data pairs, one of the plurality of candidate values calculated for each of the K permutations approaches zero.

7. The recorded data processing method according to claim 1, wherein
content in which the N pieces of recorded data are synchronized with each other according to the time difference identified for each of the N recorded data pairs is generated.

8. A recorded data processing device comprising:
a candidate value calculating unit configured to calculate, for each of N (N is a natural number of three or more) recorded data pairs each formed by two pieces of recorded data that are adjacent to each other when N pieces of recorded data each representing a recording target including at least one of audio and video are arranged cyclically, a plurality of candidate values for a time difference between time signals representing temporal changes of the recording target in the two respective pieces of recorded data of the recorded data pair; and
an analysis processing unit configured to identify one of the plurality of candidate values in each of the N recorded data pairs as the time difference between the two pieces of recorded data in the recorded data pair such that a numerical value obtained by summing, over the N recorded data pairs, one of the plurality of candidate values calculated for each of the N recorded data pairs approaches zero.

9. The recorded data processing device according to claim 8, wherein
in the calculating of the plurality of candidate values, the plurality of candidate values of each of the recorded data pairs are calculated according to a cross-correlation between the time signals in the two pieces of recorded data of the recorded data pair.

10. The recorded data processing device according to claim 9, wherein
in the calculating of the plurality of candidate values, a plurality of time differences corresponding to respective maxima when an absolute value of the cross-correlation between the time signals in the two pieces of recorded data is smoothed are identified as the plurality of candidate values.

11. The recorded data processing device according to claim 8, wherein
the time signals are audio signals representing temporal changes in the audio.

12. The recorded data processing device according to claim 8, wherein
in the calculating of the plurality of candidate values, the plurality of candidate values are calculated for each of the N recorded data pairs in the N pieces of recorded data overlapping each other on a time axis among a plurality of pieces of recorded data.

13. The recorded data processing device according to claim 8, wherein
in the calculating of the plurality of candidate values, the plurality of candidate values in each of the N recorded data pairs are calculated for each of K permutations in cyclic arrangements of the N pieces of recorded data, and
one of the plurality of candidate values in each of the N recorded data pairs in one of the K permutations is identified as the time difference between the two pieces of recorded data in the recorded data pair such that a numerical value obtained by summing, over the N recorded data pairs, one of the plurality of candidate values calculated for each of the K permutations approaches zero.

14. The recorded data processing device according to claim 8, wherein
content in which the N pieces of recorded data are synchronized with each other according to the time difference identified for each of the N recorded data pairs is generated.

* * * * *